(12) United States Patent
Kanazawa

(10) Patent No.: US 11,511,441 B2
(45) Date of Patent: Nov. 29, 2022

(54) DRIVING APPARATUS AND CONVEYING APPARATUS

(71) Applicant: HIRATA CORPORATION, Kumamoto (JP)

(72) Inventor: Keiji Kanazawa, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 336 days.

(21) Appl. No.: 16/823,397

(22) Filed: Mar. 19, 2020

(65) Prior Publication Data

US 2020/0306991 A1     Oct. 1, 2020

(30) Foreign Application Priority Data

Mar. 28, 2019 (JP) .............................. JP2019-063991

(51) Int. Cl.
  *B25J 15/00* (2006.01)
  *B25J 9/00* (2006.01)

(52) U.S. Cl.
  CPC ......... *B25J 15/0019* (2013.01); *B25J 9/0093* (2013.01)

(58) Field of Classification Search
  CPC ...... B25J 15/0019; B25J 9/0093; B25J 9/041; B25J 19/0079; B25J 19/00; B25J 19/0075; H01L 21/67742; H01L 21/67766
  See application file for complete search history.

(56) References Cited

U.S. PATENT DOCUMENTS

| 6,837,672 B1 * | 1/2005 | Tateyama .......... H01L 21/68707 414/815 |
| 8,454,068 B2 * | 6/2013 | Hashimoto ....... H01L 21/67748 294/902 |

(Continued)

FOREIGN PATENT DOCUMENTS

| JP | S62-041408 A | 2/1987 |
| JP | S62228394 A | 10/1987 |

(Continued)

OTHER PUBLICATIONS

Office Action (Notice of Reasons for Refusal) dated Mar. 29, 2021, in corresponding Japanese Patent Application No. 2019-063991 and English translation of the Office Action. (11 pages).

(Continued)

*Primary Examiner* — Stephen A Vu
(74) *Attorney, Agent, or Firm* — Buchanan Ingersoll & Rooney PC

(57) ABSTRACT

A driving apparatus includes a rotation body in which at least a lower portion is a cylindrical rotated portion, a housing including a top plate portion in which the rotated portion is inserted, a driving mechanism provided in the housing and configured to rotate the rotation body, and an exhaust unit. The top plate portion of the housing comprises a circular opening in which the rotated portion is inserted, and a groove portion provided to surround the opening and communicating with the opening. The groove portion comprises, at at least one point of the groove portion in a circumferential direction, a wide portion whose groove width in a radial direction of the opening is made large. The exhaust unit is provided to communicate with the wide portion and exhausts air in the groove portion.

6 Claims, 10 Drawing Sheets

(56) References Cited

U.S. PATENT DOCUMENTS

| | | | |
|---|---|---|---|
| 8,720,965 B2* | 5/2014 | Hino | H01L 21/68707 |
| | | | 414/744.8 |
| 8,764,085 B2* | 7/2014 | Urabe | B25J 15/0014 |
| | | | 414/744.8 |
| 9,943,969 B2 | 4/2018 | Barker et al. | |
| 2004/0113444 A1* | 6/2004 | Blonigan | H01L 21/68707 |
| | | | 294/902 |
| 2013/0323002 A1 | 12/2013 | Furuichi et al. | |

FOREIGN PATENT DOCUMENTS

| | | |
|---|---|---|
| JP | H09-029682 A | 2/1997 |
| JP | 2012-056034 A | 3/2012 |
| JP | 2015-123551 A | 7/2015 |
| JP | 2015123549 A | 7/2015 |
| JP | 6448239 B2 | 1/2019 |
| KR | 10-1334690 B1 | 12/2013 |
| WO | 2014102887 A1 | 7/2014 |
| WO | 2016/009785 A1 | 1/2016 |

OTHER PUBLICATIONS

Office Action dated Jan. 19, 2021 issued in corresponding Singapore Patent Application No. 10202002618U (9 pages).

Office Action dated Oct. 15, 2020, by the Taiwanese Patent Office in corresponding Taiwanese Patent Application No. 109105684. (4 pages).

* cited by examiner

DRIVING APPARATUS AND CONVEYING APPARATUS

CROSS-REFERENCE TO RELATED APPLICATION(S)

This application claims priority to and the benefit of Japanese Patent Application No. 2019-063991 filed on Mar. 28, 2019, the entire disclosure of which is incorporated herein by reference.

BACKGROUND OF THE INVENTION

Field of the Invention

The present invention relates to a driving apparatus and a conveying apparatus.

Description of the Related Art

In a driving, apparatus that rotates a rotation body, like a driving apparatus that turns a robot arm, an air flow is generated around the rotation body, Since such an air flow causes particles in the driving apparatus to leak to the outside of the apparatus, a measure to suppress generation of particles is needed in a driving apparatus used in a clean room, like a conveying robot that conveys a semiconductor wafer. In Japanese Patent Laid-Open No. 62-226394, a suction tube is arranged near a rotation body to suck air outside an apparatus, thereby suppressing leakage of particles in the apparatus.

In the arrangement of Japanese Patent Laid-Open No. 62-228394, since the suction tube makes suction in the internal space of the apparatus, air outside the apparatus is readily introduced into the internal space of the apparatus. When the air outside the apparatus is introduced into the internal space of the apparatus, moisture in the air causes corrosion or rust on mechanisms in the apparatus.

SUMMARY OF THE INVENTION

It is an object of the present invention to make it difficult to introduce air outside an apparatus into the internal space of the apparatus while suppressing leakage of particles in the apparatus to the outside of the apparatus.

According to an aspect of the present invention, there is provided a driving apparatus comprising: a rotation body in which at least a lower portion is a cylindrical rotated portion; a housing including, a top plate portion in which the rotated portion is inserted; a driving mechanism provided in the housing and configured to rotate the rotation body; and an exhaust unit, wherein the top plate portion of the housing comprises a circular opening in which the rotated portion is inserted, and a groove portion provided to surround the opening and communicating with the opening, the groove portion comprises, at at least one point of the groove portion in a circumferential direction, a wide portion whose groove width in a radial direction of the opening is made large, and the exhaust unit is provided to communicate with the wide portion and exhausts air in the groove portion.

Further features of the present invention will become apparent from the following description of exemplary embodiments (with reference to the attached drawings).

DESCRIPTION OF THE EMBODIMENTS

Figure 1:
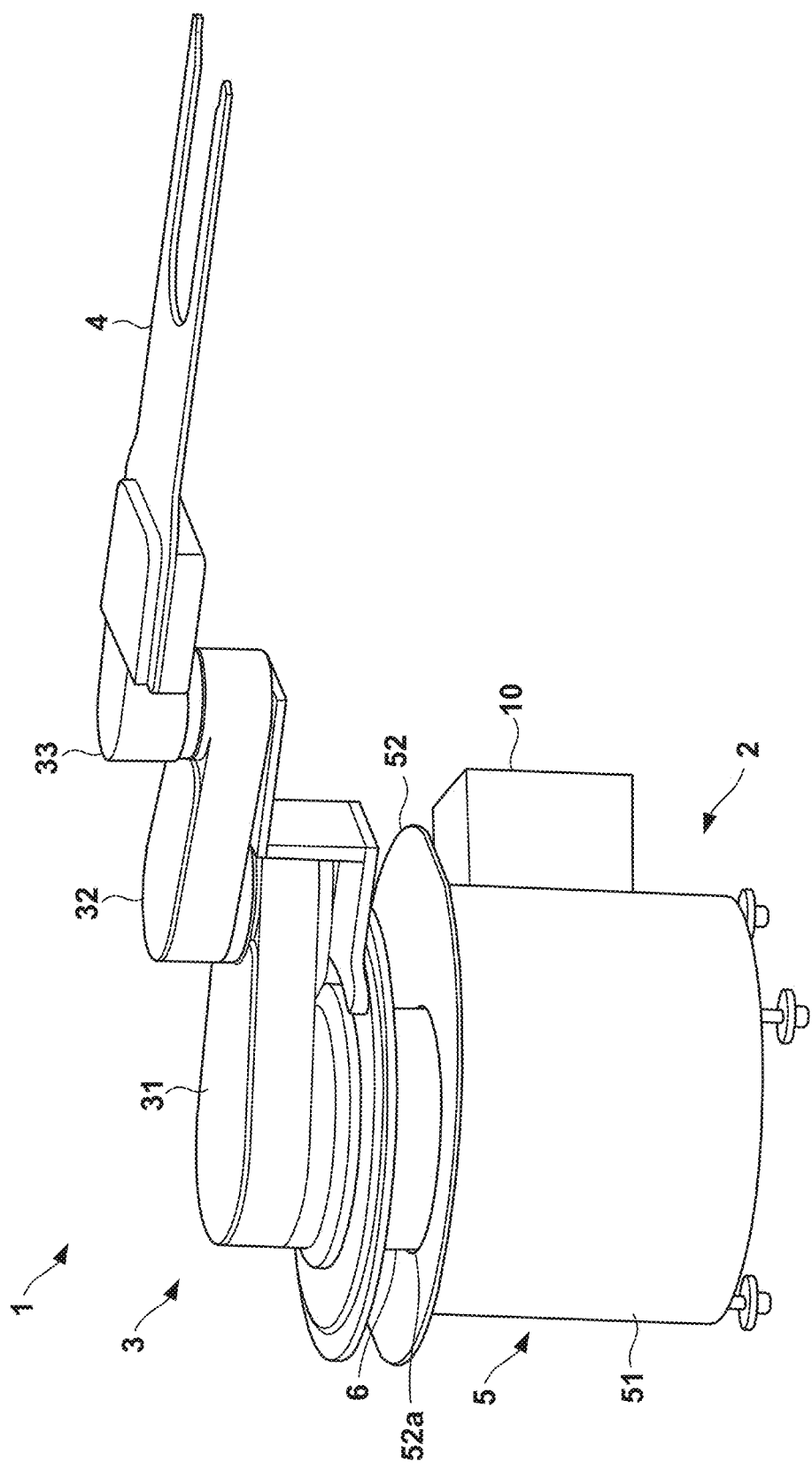
FIG. 1 is a perspective view of a conveying apparatus according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Conveying Apparatus

FIG. 1 is a perspective view of a conveying apparatus 1 according to an embodiment of the present invention. The conveying apparatus 1 includes a driving apparatus 2, a robot arm 3, and an end effector 4. The conveying apparatus 1 according to this embodiment is an apparatus that conveys a substrate such as a semiconductor wafer, and the end effector 4 is a hand that holds the substrate. The robot arm 3 is an extensible articulated arm, and includes three arm portions 31 to 33. The arm portion 32 is pivotally supported at an end portion of the arm portion 31, and the arm portion 33 is pivotally supported at an end portion of the arm portion 32. The arm portion 33 supports the end effector 4. The robot arm 3 is attached to a rotation body 6 of the driving apparatus 2. The rotation body 6 rotates about a rotation center line in the vertical direction to turn the robot arm 3.

Driving Apparatus

Figure 2:
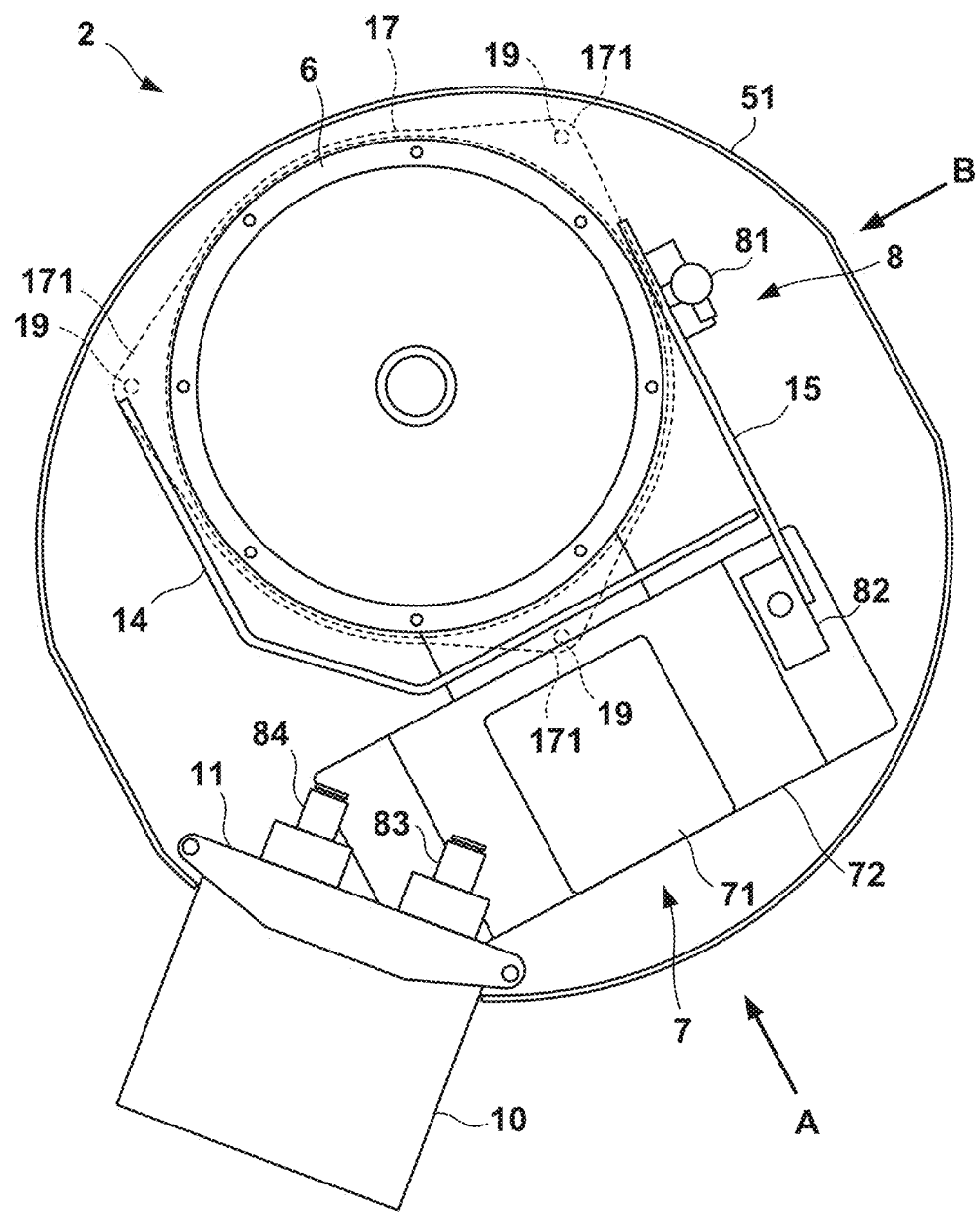
FIG. 2 is as plan view of a driving apparatus provided in the conveying apparatus shown in FIG. 1.
Figure 3:
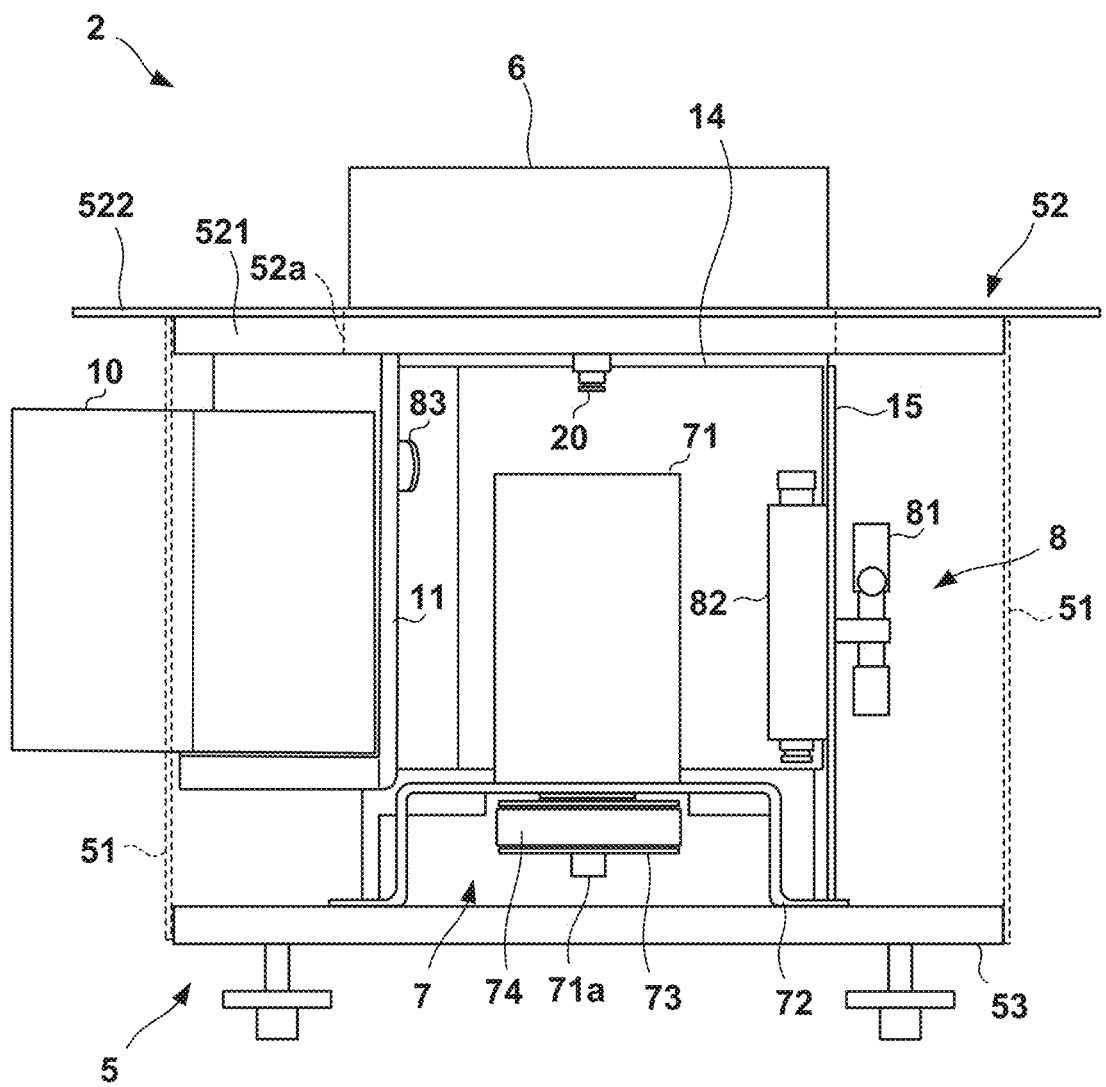
FIG. 3 is a view showing the internal structure of the driving apparatus provided in the conveying apparatus shown in FIG. 1.
Figure 4:
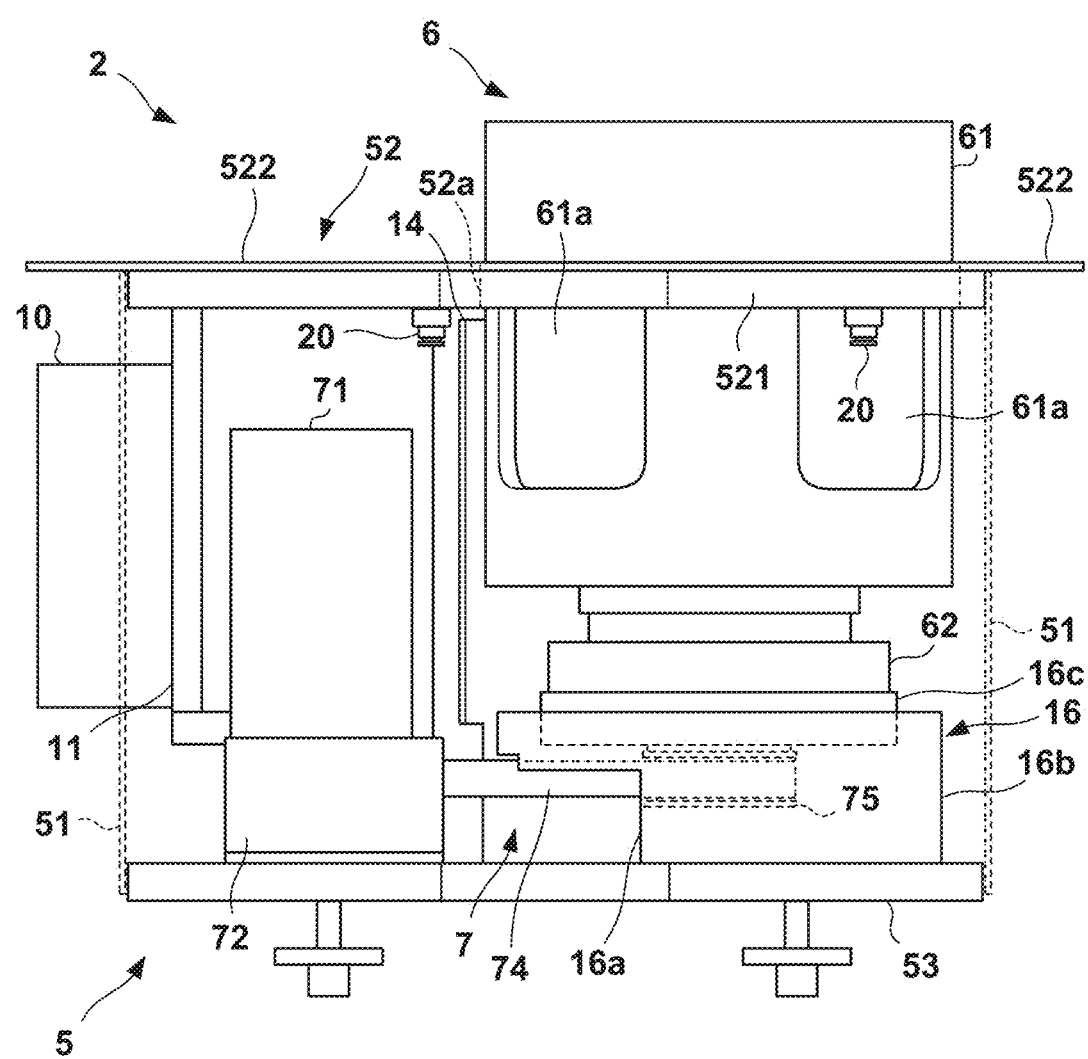
FIG. 4 is a view showing the internal structure of the driving apparatus provided in the conveying apparatus shown in FIG. 1.

The structure of the driving apparatus 2 will be described with reference to FIGS. 1 to 4. FIG. 2 is a plan view of the driving apparatus 2 in a state in which a top plate portion 52 is detached. FIGS. 3 and 4 are views showing the internal structure of the driving apparatus 2 through a peripheral wall portion 51. FIG. 3 is a side view viewed in the direction of an arrow A shown in FIG. 2, and FIG. 4 is a side view viewed in the direction of an arrow B shown in FIG. 2. In FIG. 4, a protection cover 15 and the like are not illustrated.

The driving apparatus 2 includes a housing 5, the rotation body 6, a driving mechanism 7, and an exhaust unit 8. The housing 5 includes the peripheral wall portion 51, the lop plate portion 52, and a bottom wall portion 53, and forms the outer wall of the driving apparatus 2. The peripheral wall portion 51 is a tubular member that is open on the upper and lower sides, and has a cross-section having a circular shape (more exactly, a long circular shape). The bottom wall portion 53 is a plate-shaped member that closes the lower opening of the peripheral wall portion 51 and supports constituent components stored in the housing 5, and has the same outer shape as the cross-sectional shape of the peripheral wall portion 51.

The top plate portion 52 closes the upper opening of the peripheral wall portion 51, and forms a circular opening 52a in which the rotation body 6 is inserted. The upper portion of the rotation body 6 projects from the opening 52a to the upper side of the housing 5, and the lower portion is stored in the internal space of the housing 5. The top plate portion 52 according to this embodiment is a stacked body off plate member 521 on the lower side and a plate member 522 on the upper side. A groove portion 17 that communicates with the opening 52a is formed in the top plate portion 52. Details of the groove portion 17 will be described later.

The rotation body 6 is a driving shaft that is rotated by the driving mechanism 7 to turn the arm 3. The rotation body 6 includes a cylindrical main body 61 to which the arm 3 is connected, and a rotated portion 62 that is fixed to the lower portion of the main body 61 and forms the lower portion of the rotation body 6, in the peripheral wall of the main body 61, a plurality of through holes 61a are formed in the circumferential direction at positions on the lower side of the plate member 522. Air can circulate between the inside of the main body 61 and the outside of the main body 61 via the through holes 61a. The through holes 61a are arranged at an equal pitch (equal angle) in the circumferential direction of the main body 61. In this embodiment, four through holes 61a are arranged. The rotated portion 62 is fixed coaxially with the main body 61, and rotatably supported by a bearing 16c. A bearing support member 16b that supports the bearing 16c is a cylindrical hollow body, is supported by the bottom wall portion 53, and includes a notch 16a in part of its peripheral wall.

The driving; mechanism 7 includes a motor 71 that is a driving source, and a support member 72 that supports the motor 71, the support member 72 has a gate shape, and the motor 71 is supported on it. An output shaft 71a of the motor 71 projects downward inside the support member 72. A pulley 73 is fixed to the output shaft 71a. The driving mechanism 7 also includes a pulley 75 fixed to the rotated portion 62 is the hearing 16c, and an endless belt 74 is wound between the pulley 73 and the pulley 75. The pulley 75 is arranged in the internal space of the bearing support member 16b that supports the bearing 16c, and the belt 74 enters the internal space of the bearing support member 16b through the notch 16a.

When the motor 71 is driven, the driving force is transmitted to the rotation body 6 via the belt 74, and the rotation body 6 rotates. In this embodiment, a belt transmission mechanism is employed as the transmission mechanism of the driving force of the motor 71 to the rotation body 6, However, it may be a transmission mechanism of another type, such as a gear mechanism or a chain transmission mechanism.

The components of the driving mechanism 7 such as the pulley, the belt, and the gear are particle generation sources. In this embodiment, to prevent particles from leaking to the outside of the apparatus, the exhaust unit 8 exhausts air in the housing 5 to hold the interior at a negative pressure with respect to the external environment, thereby preventing the particles from leaking to the outside.

Protection covers 14 and 15 that surround the periphery of the rotation body 6 are provided in the internal space of the housing 5. The center axis of the rotation body 6 according to this embodiment is arranged at a position offset from the center portion of the housing 5. The protection covers 14 and 15 are plate-shaped members extended in the vertical direction, and are supported by the bottom wall portion 53. The protection cover 14 is a plate member having an L shape in a planar view, and the protection cover 15 is a flat plate member. The protection covers 14 and 15 are combined into a U shape in a planar view. The protection covers 14 and 15 and the peripheral wall portion 51 discontinuously surround the rotation body 6. The protection covers 14 and 15 are provided mainly for the purpose of preventing various kinds of components (for example, wirings and pipes) arranged in the internal space of the housing 5 from coming into contact with the rotation body 6. The protection covers 14 and 15 are also used as support members for the components.

The exhaust unit 8 is a mechanism that exhausts air in the groove portion 17 to the outside of the housing 5. The exhaust unit 8 includes an ejector 81 and a filter 82. A joint 20 communicating with the groove portion 17 is attached to the top plate portion 52, and the ejector 81 and the joint 20 communicate via a pipe (not shown). In addition, the ejector 81 communicates with the filter 82 via a pipe (not shown), and the filter 82 communicates with a joint 83 for exhaust. The joint 83 is supported by a bracket 11. A notch is formed in part of the peripheral wall portion 51 of the housing 5 and closed by the bracket 11. The bracket 11 supports a box 10 arranged outside the housing 5.

The box 10 stores a silencer (not shown) communicating with the joint 83 and a compressed air supply source (not shown) such as a pump. The supply source communicates with the ejector 81 via a joint 84 supported by the bracket 11 and a pipe (not shown), and supplies compressed air to the ejector 81. The ejector 81 generates a negative pressure inside by the supplied compressed air, and sucks air in the groove portion 17. Particles in the sucked air are removed by the filter 82, and the air is exhausted into the box 10.

Top Plate Portion and Exhaust Function

Figure 5:
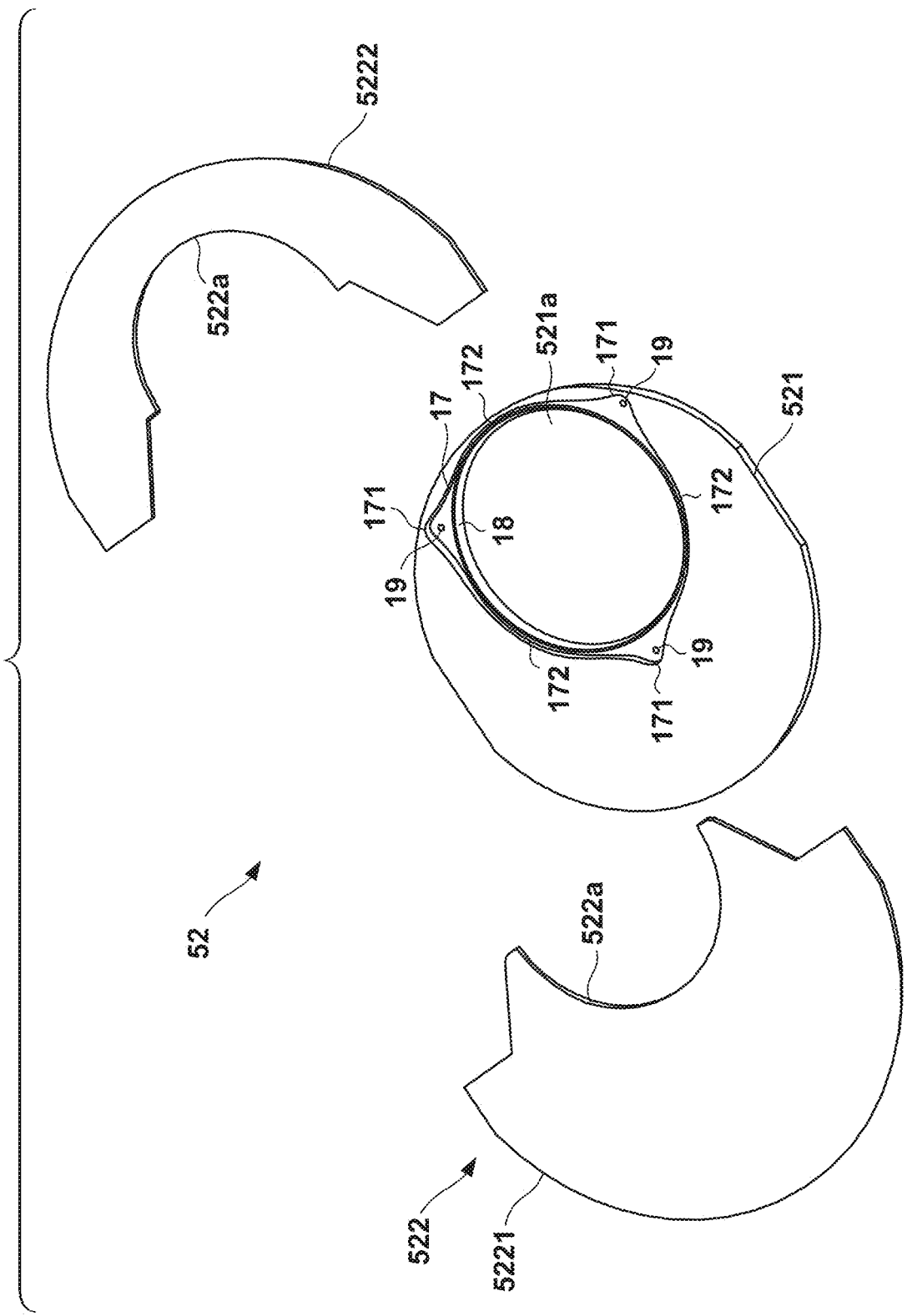
FIG. 5 is an exploded perspective view of a top plate portion.

The structure of the top plate portion 52 will be described with reference to FIG. 5. FIG. 5 is an exploded perspective view of the top plate portion 52. The top plate portion 52 according to this embodiment is formed by one plate member 521 and two plate members 5221 and 5222 stacked on the plate member 521. An opening 521a that forms the opening 52a is thrilled in the plate member 521. Around the opening 521a, the groove portion 17 provided to surround the opening 521a is formed. The plate member 521 also includes a partition 18 located between the groove portion 17 and the opening 52a. In other words, the partition 18 is a wall member provided at the inner peripheral edge of the opening 52a vertically with respect to the plate member 521. In this embodiment, an example in which the groove portion 17 and the partition 18 are formed continuously throughout the perimeter of the opening 52a has been described. However, they may be formed only at part in the circumferential direction, or may be formed discontinuously at an interval in the circumferential direction.

The two plate members 5221 and 5222 are combined with each other to form one plate member 522. An arc portion 522a that forms the opening 52a is formed in each of the plate members 5221 and 5222. The arc portion 522a has a shape formed by halving the circle of the opening 52a, and one circular opening is formed by, the two arc portions 522a. When the combined plate member 522 is stacked on the plate member 521, the upper side of the groove portion 17 is closed by the plate member 522. When the plate member 521 and the plate member 522 are stacked as in this embodiment, the groove portion 17 that is open on the side of the opening 52a (the inner side in the radial direction) and is closed on the remaining sides (the upper side, the outer side in the radial direction, and the lower side) can be formed.

Figure 6A:
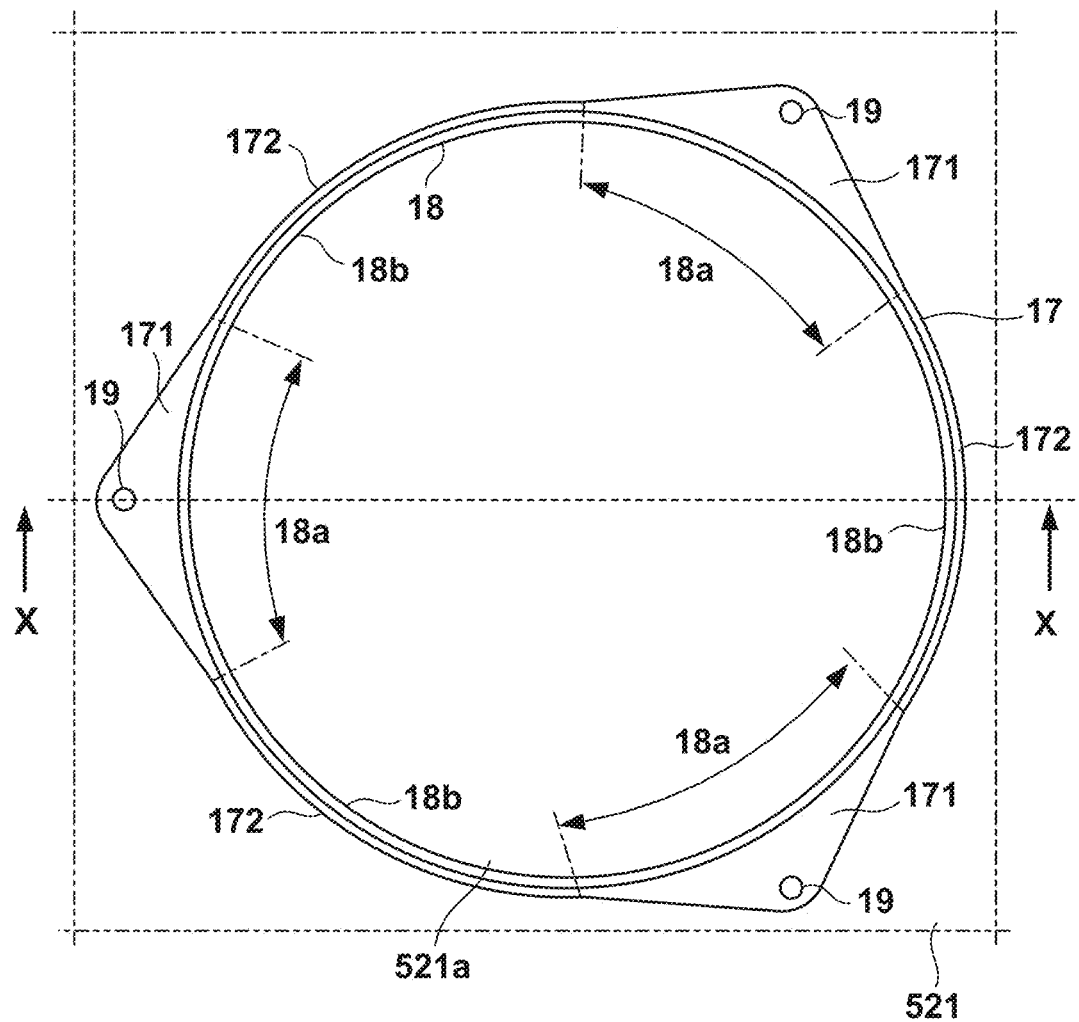
FIG. 6A is a view showing the periphery of a groove portion in a planar view.
Figure 6B:
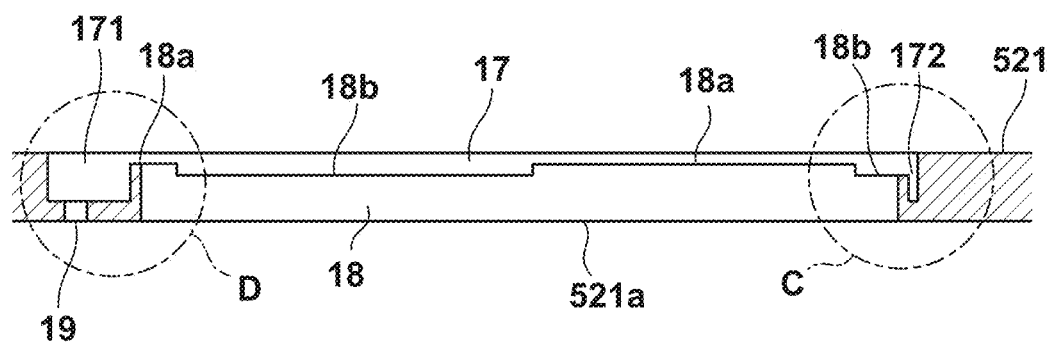
FIG. 6B is a view showing section taken along a line X-X in FIG. 6A which is viewed in the direction of arrows.

The structures of the groove portion 17 and the partition 18 will further be described with reference to FIGS. 6A and 6B. FIG. 6A is a view showing the periphery of the groove portion 17 in a planar view. FIG. 6B is a view showing a section of the plate member 521 taken along a line X-X in FIG. 6A, which is viewed in the direction of arrows.

As shown in FIG. 6A, the groove portion 17 includes a first groove portion 172 formed in a predetermined width along the opening 521a (in other words, the opening 52a), and a wide portion (second groove portion) 171 whose groove width in the radial direction of the opening 521a is larger than that of the first groove portion 172.

The wide portion 171 and a hole 19 to be described later may be provided at one point. In this embodiment, however, since an ascending air current is readily generated by the rotation of the rotation body 6 in a portion where the peripheral surface of the rotation body 6, the protection covers 14 and 15, and the peripheral wall portion 51 are close, the wide portions 171 and the holes 19 are provided at one point immediately above that portion and two nearby points, that is, a total of three points. If the ascending air current is generated, particles leak even if a negative pressure is applied to the interior of the housing 5. However, when in is sucked from the through holes 61a or holes 19 described above, the particles can be prevented from leaking to the outside.

The wide portion 171 according to this embodiment has a V shape in a planar view. When viewed in the circumferential direction of the opening 521a, the width gradually increases and then gradually decreases. The shape of the wide portion 171 in a planar view is not limited to this. If the wide portion 171 has a V shape, the air in the groove portion 17 easily smoothly flows along the circumferential direction. Note that the wide portion 171 need only have a width that allows the joint 20 to be described later to be attached to the bottom back surface of the wide portion 171.

The hole 19 is formed in each wide portion 171 (for example, the groove bottom near the widest portion). The hole 19 extends through the plate member 521 in the thickness direction. In this embodiment, one hole 19 is formed in one wide portion 171. However, a plurality of holes 19 may be formed. On the bottom back surface of the wide portion 171, the joint 20 is attached to the hole 19. The hole 19 communicates with the ejector 81 of the exhaust unit 8 via the joint 20 and a pipe. In this embodiment, the hole 19 is located in the center portion in the circumferential direction of the wide portion 171 on the outer side in the radial direction. When the holes 19 are formed at the above-described positions, and the air is sucked by the exhaust unit 8, the air in the wide portions 171 can be exhausted without staying there. As a result, the exhaust efficiency of air in the whole groove portion 17 rises.

As shown in FIG. 6B, the partition 18 includes partition portions 18a located between the wide portions 171 and the opening 52a, and partition portions 18b located between the first groove portions 172 and the opening 52a.

The height of the partition portion 18a in the vertical direction is larger than the height of the partition portion 18b.

Figure 7A:
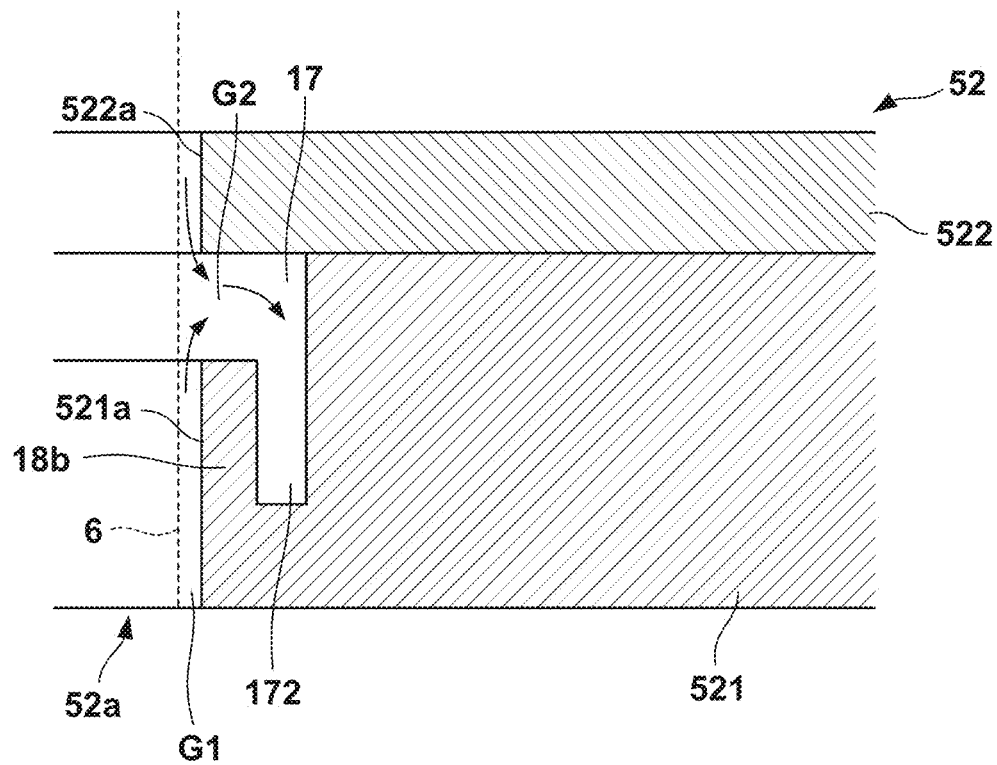
FIG. 7A is an enlarged view of a portion C shown in FIG. 6B.
Figure 7B:
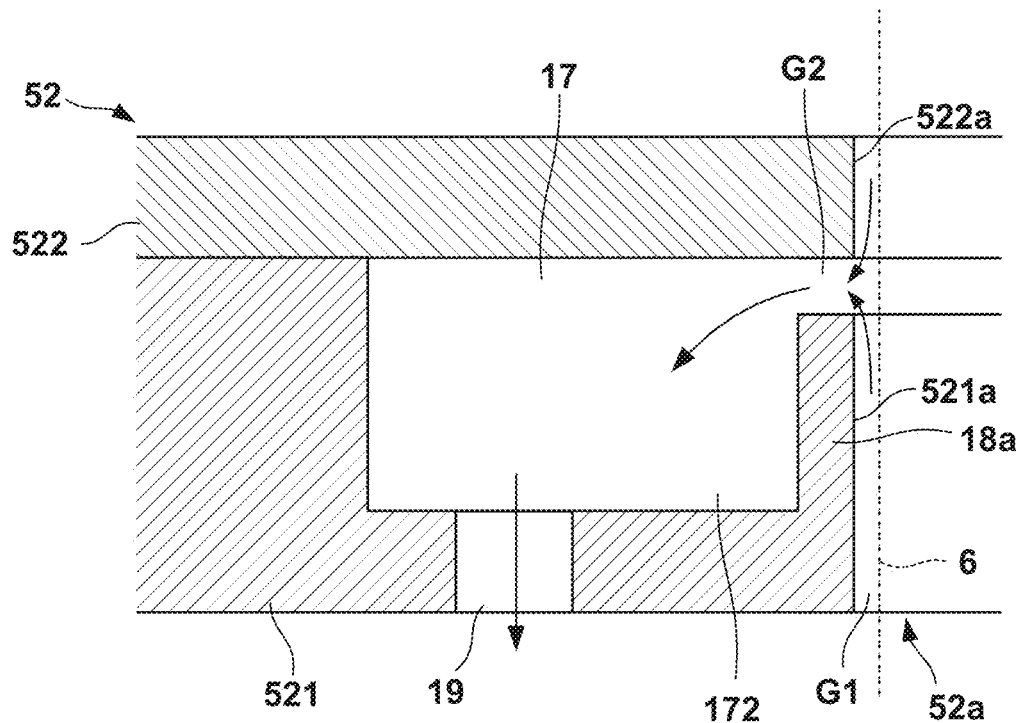
FIG. 7B is an enlarged view of a portion D shown in FIG. 6B.

FIGS. 7A and 7B will be referred to. FIGS. 7A and 7B are enlarged views of a portion C and a portion D in FIG. 6B, respectively, and show a state in which the plate member 522 is stacked on the plate member 521. When the rotation body 6 rotates, an air flow in a laminar form (laminar flow) is generated around the rotation body 6 to make the particles in the housing 5 diffuse from the opening 52a to the outside. In this embodiment, when the exhaust unit 8 operates, the air (including clean air and a gas) in a gap G1 between the outer peripheral surface of the rotation bods 6 and the inner wall surface of the opening 52a is sucked into the groove portion 17, as indicated by arrows in FIGS. 7A and 7B. At this time, part of the air is pushed by the laminar flow to flow into the groove portion 17. The remaining air is sucked by the exhaust unit 8 and taken into the groove portion 17, The size of the gap G1 is, for example, 1 mm to 3 mm, preferably, 1.5 mm to 2.5 mm, and more preferably, 1.8 mm to 2.2 mm. As for the particles in the housing 5, the air is sucked into the groove portion 17 when passing through the opening 52a. After the particles are removed by the filter 82, the air is exhausted to a predetermined portion by the exhaust unit 8. Hence, the particles do not diffuse to the outside of the driving apparatus 2.

The partition portions 18a and 18b are provided to suppress the flow of air from the outside of the driving apparatus 2 into the housing 5 and leakage of the particles from the inside of the housing 5 to the outside of the housing 5.

In addition, air that is going to enter from the outside of the housing 5 to the inside of the housing 5 via the opening 52a is also sucked into the groove portion 17 when passing through the opening 52a. Even if the air outside the housing 5 is air of high humidity or highly corrosive air, corrosion or rust on the mechanisms and structures in the housing 5 can be prevented because contact between the outside air and the mechanisms and structures in the housing 5 is suppressed.

As described above, air is sucked locally around the opening 52a, thereby making it difficult to introduce the air outside the apparatus into the apparatus while suppressing leakage of particles in the driving apparatus 2 to the outside of the apparatus, Since the volume in the gap G1 and the internal volume of the groove portion 17 are relatively small, a unit having a relatively small output suffices as the exhaust unit 8.

In the peripheral wall of the main body 61 of the rotation body 6, the through holes 61a are formed in the circumferential direction at positions on the lower side of the plate member 522. For this reason, even if an ascending air current is generated around the rotation body 6 by the rotation of the rotation body 6, the ascending air current is guided into the main body 61 via the through holes 61a. That is, when the through holes 61a are provided, the upward movement of the particles in the housing 5 along the peripheral surface of the rotation body 6 can be suppressed. In this point as well, it is possible to prevent the particles in the housing 5 from diffusing to the outside. In particular, the ascending air current is readily generated by the rotation of the rotation body 6 in a portion where the peripheral surface of the rotation body 6, the protection covers 14 and 15, and the peripheral wall portion 51 are close. However, since the air is guided into the rotation body 6 via the through holes 61a, generation of the ascending air current can be suppressed.

In the partition 18, the partition portion 18a close to the hole 19 that is an exhaust hole is formed to have a larger height in the vertical direction than the height of the partition portion 18b far from the hole 19. That is, a gap G2 (FIG. 7A) between the partition portion 18b and the plate member 522a is formed to be wider than the gap G2 (FIG. 7B) between the partition portion 18a and the plate member 522a. This makes the amount of air flowing into the groove portion 17 of the partition portion 18a smaller than the amount of air flowing into the groove portion 17 of the partition portion 18b. As a result, when the air that has flowed into the groove portion 17 of the partition portion 18b is sucked toward the hole 19, the difficulty of flowing into the groove portion 17 of the partition portion 18a is suppressed. This can uniform the flow of air in the whole groove portion 17.

Figure 8A:
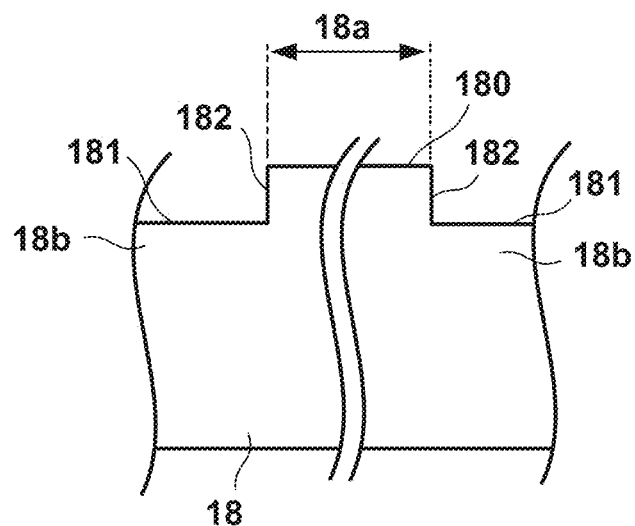
FIG. 8A is an explanatory view of a partition.

FIG. 8A shows the shape of the boundary portion between the partition portion 18a and the partition portion 18b. An upper surface 180 of the partition portion 18a and an upper surface 181 of the partition portion 18b continue via a side surface 182 of the partition portion 18a in the circumferential direction. In the example shown in FIG. 8A, both the upper surfaces 180 and 181 are horizontal surfaces, and the side surface 182 is a vertical surface orthogonal to the upper surfaces 180 and 181. The shape of the boundary portion between the partition portion 18a and the partition portion 18b is formed into a rectangular shape, and processing of the partition 18 is relatively easy.

Other Embodiments

Figure 8B:
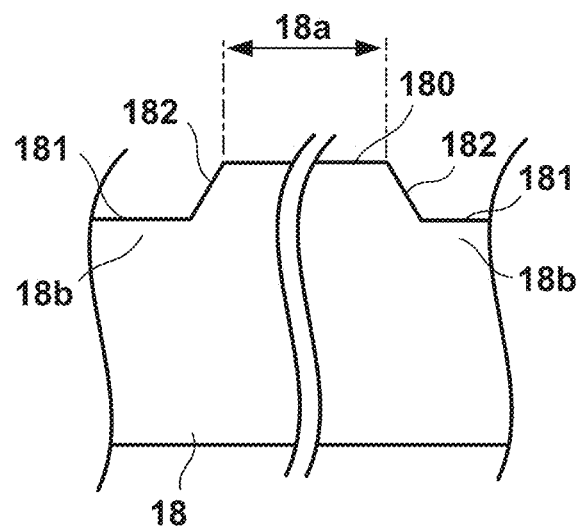
FIGS. 8B and 8C are views showing other structure examples of the partition.
Figure 8C:
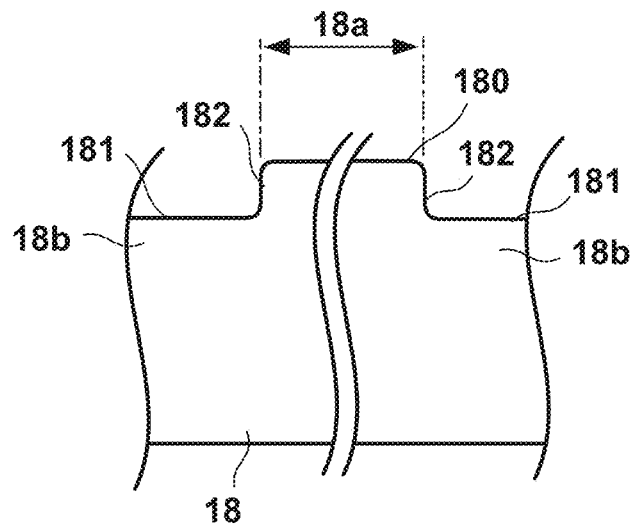

The shape of the boundary portion between the partition portion 18a and the partition portion 18b is not limited to the shape shown in FIG. 8A, FIGS. 8B and 8C show other examples of the shape of the boundary portion between the partition portion 18a and the partition portion 18b. In the example shown in FIG. 8B, both the upper surfaces 180 and 181 are horizontal surfaces, and the side surface 182 is a tilting suffice obliquely crossing the upper surfaces 180 and 181. In the boundary portion between the partition portion 18a and the partition portion 18b, a change in suction of air into the groove portion 17 can be made relatively moderate.

In the example shown in FIG. 8C, the boundary portion between the side surface 182 and the upper surface 180 and the boundary portion between the side surface 182 and the upper surface 181 are rounded (R surface processing is performed) in the example shown in FIG. 8A, In the example shown in FIG. 8B, R surface processing may be performed for the boundary portion between the upper surface 180 and the tilting surface and the boundary portion between the tilting surface and the upper surface 181 as well.

Figure 9A:
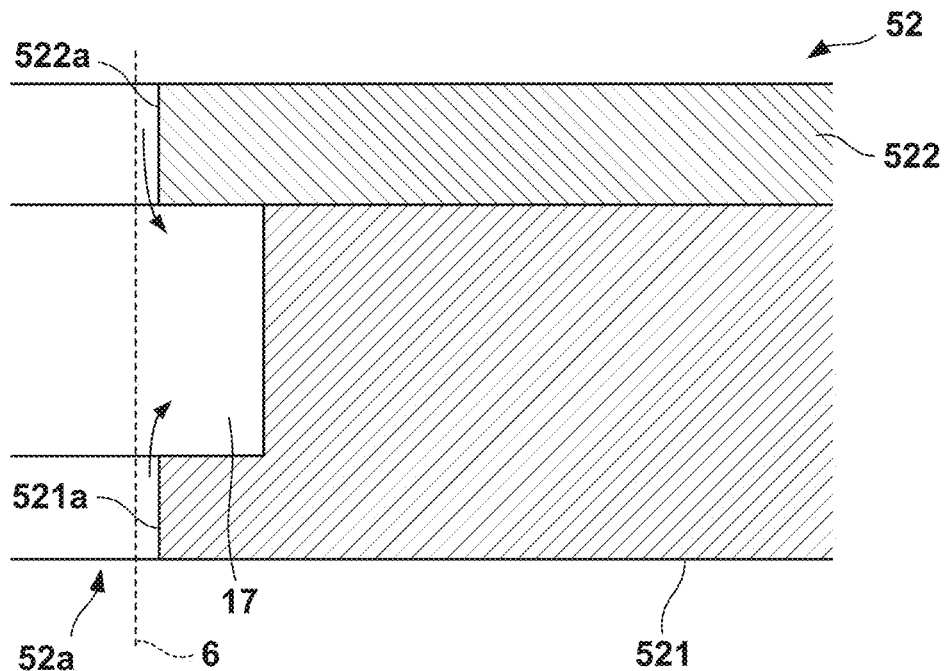
FIGS. 9A and 9B are views showing other formation examples of the groove portion.

The structure of the groove portion 17 is not limited to the structure of the above embodiment. FIG. 9A shows another structure example of the groove portion 17, In the example shown in FIG. 9A, the partition 18 does not exist, and the whole groove portion 17 is open to the opening 52a. In an example shown in FIG. 9B, the groove portion 17 is formed using the plate member 522 and an annular member 523 having an L-shaped section in place of the plate member 521. The annular member 523 includes an opening 523a that forms the opening 52a. The hole 19 is formed in the side portion of the annular member 523, but may be formed in the bottom portion. In addition, the annular member 523 may be provided with the partition 18 located between the groove portion 17 and the opening 52a.

Figure 9B:
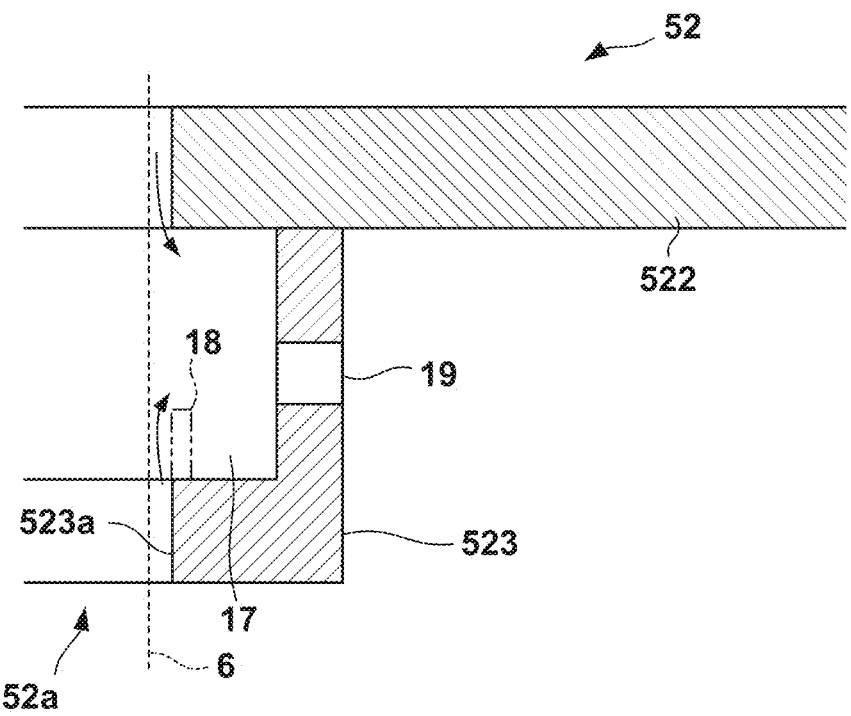
Figure 10A:
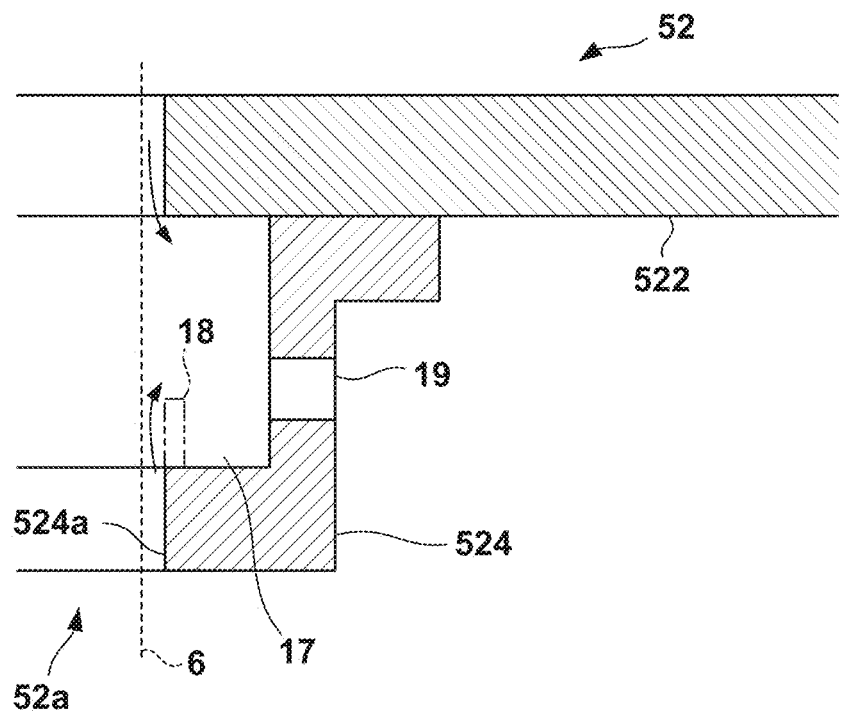
FIGS. 10A and 10B are views showing still other formation examples of the groove portion.
Figure 10B:
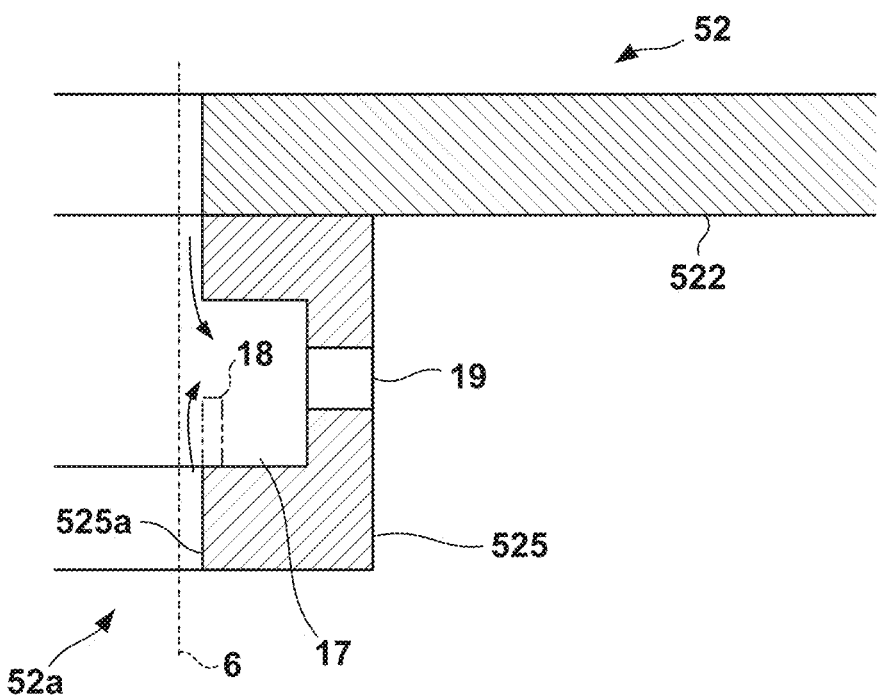

In an example shown in FIG. 10A, the groove portion 17 is formed using the plate member 522 and an annular member 524 having a Z-shaped section in place of the plate member 521, In other words, the annular member 524 includes, at the upper edge of the annular member 523 shown in FIG. 9B, a flange portion extended to the outer peripheral side in the radial direction. The annular member 524 includes an opening 524a that forms the opening 52a. The hole 19 is formed in the side portion of the annular member 524, but may be thrilled in the bottom portion. In an example shown in FIG. 10B, the groove portion 17 is formed using the plate member 522 and an annular member 525 having a C-shaped section opening to the inner peripheral side in place of the plate member 521. In other words, the annular member 525 includes, at the upper edge of the annular member 523 shown in FIG. 9B, a flange portion extended to the inner peripheral side in the radial direction. The annular member 525 includes an opening 525a that forms the opening 52a. The hole 19 is formed in the side portion of the annular member 525, but may, be formed in the bottom portion. In addition, each of the annular members 524 and 525 may be provided with the partition 18 located between the groove portion 17 and the opening 52a.

The invention is not limited to the foregoing embodiments, and various variations/changes are possible within the spirit of the invention.

What is claimed is:

1. A driving apparatus comprising:
   a rotation body in which at least a lower portion is a cylindrical rotated portion;
   a housing including a top plate portion in which the rotated portion is inserted;
   a driving mechanism provided in the housing and configured to rotate the rotation body; and
   an exhaust unit,
   wherein the top plate portion of the housing comprises:
   a first plate member in which a circular opening in which the rotated portion is inserted, a groove portion provided to surround the circular opening and communicating with the circular opening, and a partition between the circular opening and the groove portion are formed; and
   a second plate member provided to be stacked on the first plate member and configured to close the groove portion,
   at least one part of the groove portion in a circumferential direction has a groove width in a radial direction of the circular opening that is wider than a groove width of a remaining part of the groove portion, and
   the exhaust unit is provided to communicate with each wider part of the groove portion and exhausts air in the groove portion.

2. The apparatus according to claim 1, wherein each wider part of the groove portion in the housing has a V shape in a planar view, and at least one hole is provided in each wider part of the groove portion, and
   the exhaust unit is connected to the hole.

3. The apparatus according to claim 1, wherein the partition includes a first partition portion between each wider part of the groove portion and the circular opening, and a second partition portion between the circular opening and the groove portion other than each wider part of the groove portion, and a height of the first partition portion is larger than a height of the second partition portion.

4. The apparatus according to claim 3, wherein in a boundary portion between the first partition portion and the second partition portion, an upper surface of the first partition portion and an upper surface of the second partition portion continue via a side surface of the first partition portion, and the side surface is a vertical surface orthogonal to the upper surface of the first partition portion.

5. The apparatus according to claim 1, wherein at least one through hole is formed in a peripheral surface of the rotation body.

6. A conveying apparatus comprising:
a driving apparatus of claim 1;
an arm attached to a rotation body; and
an end effector provided on the arm and configured to hold a work.

* * * * *